United States Patent [19]

James

[11] 3,784,872

[45] Jan. 8, 1974

[54] SCAN DEFLECTION CIRCUIT DEVICE

[75] Inventor: Donald N. James, St. Paul, Minn.

[73] Assignee: Ball Brothers Research Corporation, Boulder, Colo.

[22] Filed: Sept. 2, 1971

[21] Appl. No.: 177,242

[52] U.S. Cl. .......... 315/27 TD
[51] Int. Cl. .......... H01j 29/70
[58] Field of Search .......... 315/27 TD, 27 R, 315/28, 29, 26

[56] References Cited

UNITED STATES PATENTS

| | | | |
|---|---|---|---|
| 3,648,099 | 3/1972 | Otten et al. | 315/27 TD |
| 3,235,767 | 2/1966 | Bahring | 315/27 TD |
| 3,402,318 | 9/1968 | McDonald et al. | 315/27 R |
| 3,428,856 | 2/1969 | Jones | 315/27 TD |
| 3,467,882 | 9/1969 | Young | 315/27 R |
| 3,487,260 | 12/1969 | Eberhard | 315/27 R |
| 3,430,077 | 2/1969 | Wolber | 315/27 R |

OTHER PUBLICATIONS

Electronics; August 24, 1964; "SCR's for 19–inch TV," by Shergalis; pages 97 and 98.

*Primary Examiner*—Carl D. Quarforth
*Attorney*—James D. Haynes

[57] ABSTRACT

A circuit device for use in a multi-line rate image reproducing assembly such as, for example, a video monitor is disclosed herein. The device, which permits changing the line rate of the assembly without changing the horizontal dimensions of the reproduced image and which in normal operation requires only a single adjustment control for acheiving this end, includes circuitry connected with the adjustment control and responsive to a selected voltage level supplied from a source for producing, across the horizontal deflection coil of the image reproducing assembly, a scan deflection signal having both its peak amplitude and frequency of occurrence dependent upon the selected voltage level. A linear voltage controlled oscillator is provided and cooperates with the voltage source and single adjustment control for changing the deflection signal's frequency of occurrence without changing it peak-to-peak amplitude.

9 Claims, 2 Drawing Figures

INVENTOR.
DONALD N. JAMES
BY Robert E Harris
ATTORNEY

SCAN DEFLECTION CIRCUIT DEVICE

BACKGROUND OF THE INVENTION

1. Field of the Invention

This invention relates generally to circuitry which controls scanning in an image reproducing assembly and more particularly to scan controlling circuitry capable of changing the line rate in an image reproducing assembly without changing the horizontal dimensions of the reproduced image.

2. Description of the Prior Art

Controls for waveforms in image reproducing assemblies such as, for example, television monitors are well known and include, for example, horizontal scan deflection systems. Typical of such systems is a standard circuit which utilizes the assembly's horizontal deflection coil as an inductor for producing, through the coil, a sawtooth waveform of current at a frequency of occurrence which determines the desired line rate of the image reproducing assembly and at an amplitude which determines the horizontal dimension of the reproduced image.

The aforestated sawtooth waveform of current is commonly developed by providing, along with the inductor coil, a direct current source, charging capacitor and damping diode. In addition, a switching component such as, for example, a transistor is connected in series with the inductor coil and responsive to a periodically applied signal for establishing the waveform's frequency of occurrence. As is well known with this typical type of scanning circuit, the magnitude or amplitude of the sawtooth waveform of current developed thereby is a function of two variables, that is the voltage level, supplied from the direct current source and the waveform's frequency of occurrence. Specifically, the waveform's amplitude will increase by increasing the applied voltage level and will decrease by increasing its frequency of occurrence.

It is often desirable and sometimes mandatory to change the frequency of the waveform and therefore the line-rate of the image reproducing device, but heretofore such changes have normally resulted in undesired changes in the waveform's peak amplitude. For example, it is desirable, due to limited monitor screen capacity, to maintain the horizontal width of the reproduced image at a constant value. In addition, a fixed waveform amplitude is also desirable where the circuit components making up the image reproducing device are not designed to withstand an increase in current amplitude or excessively high flyback voltage which is otherwise produced by a small increase in the waveform's amplitude. In fact, it is possible that if an accidental increase in waveform amplitude and therefore a substantially larger relative increase in flyback voltage occurred, this could result in damage to the image reproducing assembly.

SUMMARY OF THE INVENTION

This invention provides a heretofore unavailable improvement to a scanning circuit particularly well suited for producing a constant peak amplitude and variable frequency scan deflection signal and hence particularly well suited for use in an image reproducing assembly such as, for example, a video monitor. Briefly, the device, which is constructed in accordance with the present invention, permits changing the line-rate of the image reproducing assembly without changing the horizontal dimensions of the reproduced image and in normal operation requires only a single adjustment control for achieving this end.

Accordingly, an object of the present invention is to provide a new and improved circuit device for producing scan deflection signals adapted for use with an image reproducing assembly such as, for example, a video monitor.

Another object of the present invention is to provide a new and improved circuit device for producing deflection signals wherein the frequency of the produced signal may be varied without changing the signal's peak amplitude.

Yet another object of the present invention is to provide a new and improved circuit device for producing scan deflection signals wherein only single adjustment means is required during normal operation of the device for changing the signal's frequency of occurrence while simultaneously maintaining its peak amplitude constant.

Still another object of the present invention is to provide a new and improved circuit device for producing scan deflection signals which device is utilized in a multi-line rate image reproducing assembly for changing the scan rate of the assembly without changing the horizontal dimensions of the reproduced image.

A further object of the present invention is to provide a new and improved scan deflection device for producing variable frequency scan deflection signals without developing excessive flyback voltage due to a change in frequency thereof.

These and other objects and features of the present invention will become apparent from the following descriptions.

DETAILED DESCRIPTION OF THE DRAWINGS

Figure 1:
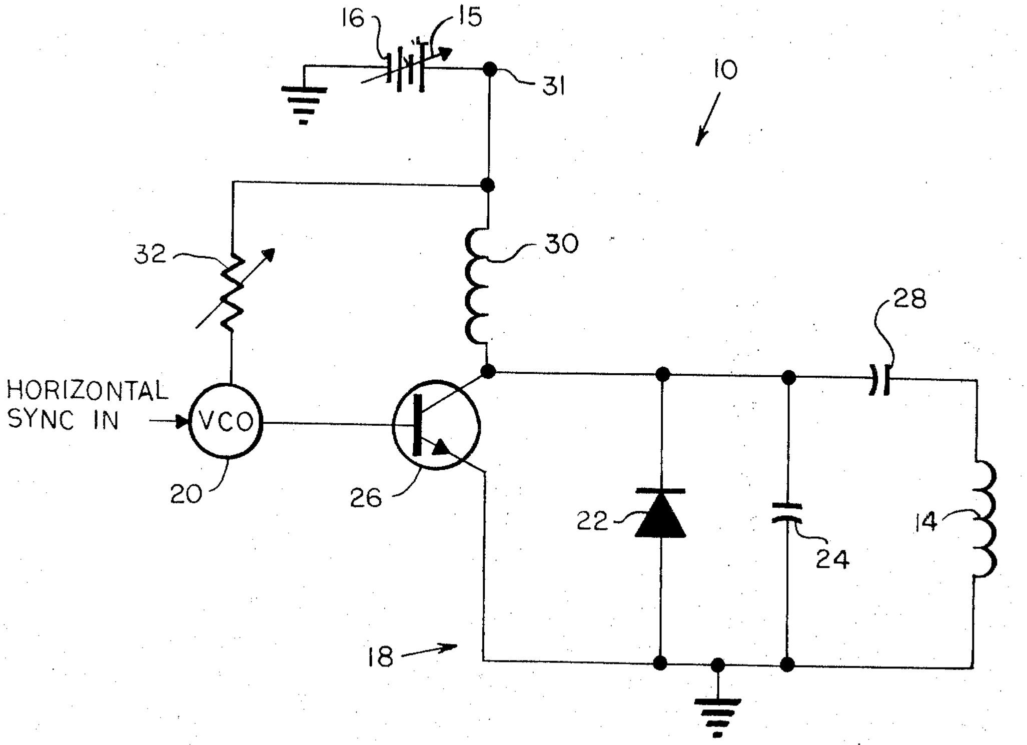
Figure 2:
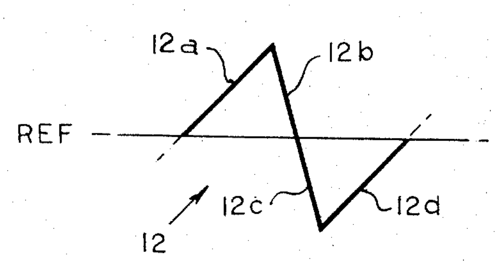

In the Drawings:

FIG. 1 is a schematic circuit design of a scan deflection circuit device constructed in accordance with the present invention; and FIG. 2 is a one cycle illustration of the scan deflection signal produced by the circuit device of FIG. 1.

DETAILED DESCRIPTION

Turning now to the drawings, FIG. 1 illustrates a horizontal deflection system 10 constructed in accordance with the present invention. System 10, which is adapted for use in a multi-line rate image reproducing device such as, for example, a multi-line rate television monitor (not shown), is provided for supplying a sawtooth waveform of current 12, illustrated in FIG. 2, across the horizontal deflection coil or inductor 14 of a yoke assembly (not shown) comprising part of the image reproducing device.

As will be seen hereinafter and in accordance with this invention, sawtooth waveform 12, which is conventionally utilized to initiate horizontal scanning of the image reproducing device, displays a constant peak amplitude or magnitude regardless of changes in frequency of occurrence thereof. In this manner, the horizontal dimension of the reproduced image, which is directly dependent upon the waveform's peak amplitude, is maintained constant regardless of changes in the horizontal line or scan rate, the latter being directly dependent on the waveform's frequency of occurrence. In addition, by maintaining the waveform's peak amplitude constant, the possibility of producing damage resulting current and flyback voltage is minimized.

The development of the aforedescribed constant peak amplitude and yet variable frequency waveform of current is accomplished, in accordance with the present invention, by selectively setting the movable arm 15 of a single variable voltage source 16 which simultaneously supplies a selected direct current voltage to a signal forming circuit 18 including deflection coil 14 and linear voltage controlled oscillator (VCO) 20, the latter of which determines the waveform's frequency of occurrence in response to the supplied voltage.

As will be seen hereinafter, the peak-to-peak amplitude of waveform 12 is ultimately a direct linear function of the selected voltage level applied to signal forming circuit 18 and an equal but inverse linear function of the selected voltage level applied to the VCO. Accordingly, since the same voltage level is simultaneously applied to both circuit 18 and VCO 20, the peak amplitude of waveform 12 and therefore the horizontal dimension of the reproduced image will remain constant regardless of changes in the waveform's frequency and therefore regardless of changes in the horizontal scan rate of the image reproducing device.

Although not disclosed, it is to be realized that horizontal synchronization pulses can be applied to the VCO for further control thereof as is well known in the art.

Turning to the detailed circuitry making up deflection system 10, attention is directed to signal forming circuit 18 which, as illustrated, includes inductor 14 along with a shunting diode 22, a charging capacitor 24, a transistor 26 and a relatively large capacitor 28, all of which are returned to ground as indicated in FIG. 1. Circuit 18 is connected through a constant current inductor 30 to a junction 31, which junction is connected to voltage supply 16, and is also connected at the base of transistor 26 to the output of VCO 20, the latter of which has its input also connected to voltage supply 16 through a potentiometer 32 and junction 31.

Operationally, assuming a selected voltage level has been chosen for source 16 by appropriately setting arm 15, this voltage level is applied through the constant current inductor 30 to capacitor 28 which, due to its large capacitance, acts, in effect, as a constant voltage supply displaying a voltage level equal to that of source 16. At the same time, the selected voltage level is applied through potentiometer 32 to the input of VCO 20 which provides at its output an intermittent signal, the frequency of occurrence of which is a direct linear function of the applied voltage.

The signal provided at the output of VCO 20 is applied to the base of transistor 26 and turns on the transistor for the duration thereof. With the transistor in its conductive or on state, energy is transferred from the effective voltage source 28 to deflection coil 14 causing current to flow through the coil in the direction and with the magnitude indicated by the positive-going portion 12*a* of waveform 12, as illustrated in FIG. 2. With the termination of the base applied VCO signal, the transistor is turned off and the coil breaks down causing the energy stored therein to be transferred to the charging capacitor 24 causing current to again flow through the coil in the manner indicated by the negative-going portion 12*b* of waveform 12. This transfer of energy continues until the current approaches zero whereupon capacitor 24 discharges back to the deflection coil for restoring energy to the latter and, in so doing, produces a negative-going current across the coil as indicated by portion 12*c* of waveform 12. Thereafter, upon reaching its maximum, the energy stored in coil 14 is returned to effective source 28 causing current indicated by portion 12*d*, to flow through the coil and shunting diode 22 in a positive-going manner until the energy is completely restored and the current again approaches zero. At this time, the circuit is receptive to another signal applied to the base of transistor 12 from the voltage controlled oscillator.

The aforedescribed procedure is repeated each time a signal is applied from the VCO to the base of transistor 26. Accordingly, the frequency of this applied signal determines the frequency of occurrence of waveform 12 and since the VCO is of the linear type, the frequency of its output signal and therefor the waveform's frequency of occurrence displays a direct linear dependency on the selected voltage level applied to the VCO from source 16.

From an analysis of the above-described circuit operation, it should be apparent that a substantially large flyback voltage is produced across the circuit during the charging and discharging period of capacitor 24. It has been found that this flyback voltage increases with and at a substantially greater rate than an increase in the amplitude of waveform 12. Accordingly, if the effective voltage level across capacitor 28 is increased without proportionaly increasing the frequency of waveform 12 (which reduces the magnitude of waveform 12), the amplitude of the latter will increase causing a substantially larger increase in the aforestated flyback voltage. On the other hand, if the frequency is decreased without decreasing the voltage level at capacitor 28, the amplitude of waveform 12 will also increase.

If the aforedescribed flyback voltage and current defining waveform 12 are increased above a level for which the horizontal deflection system 10 is designed, they can do damage to the components making up the system. However, as will be seen below, horizontal deflection system 10 is constructed in accordance with the present invention so that changes in waveform frequency and therefore line-rate automatically and simultaneously cause appropriate changes in the voltage level of capacitor 28 for maintaining the amplitude of waveform 12 constant.

For a greater appreciation of the present invention, attention is directed to the equation (Lenz's Law) representing waveform of current 12, which equation is as follows:

$E = L\ (di/dt)$ OR $di = Edt/L$ where, in system 10, $i$ is the current amplitude of waveform 12, E is the selected voltage level across coil 14, L is the inductance of coil 14 and $dt$ is the time differential. Since L is a constant and since $dt$ is an inverse linear function (plus an appropriate constant) of the frequency of waveform 12, it should be apparent that the current $i$, that is, the amplitude of waveform 12 is a direct linear function of the selected voltage level E and an equal but inverse linear function of the waveform's frequency of occurrence.

By utilizing linear VCO 20, which is responsive to the selected voltage level E, the frequency of occurrence of waveform 12 is also a direct linear function of E. This means that a change in the selected voltage level supplied from source 16 will change the waveform's frequency of occurrence and therefore the horizontal line-rate of the image reproducing device while at the same tine maintaining constant the amplitude of the waveform and therefore the horizontal dimension of the reproducing image. By using only one control, that is, movable arm 15 of variable source 16, the possibility of accidently causing an increase in current amplitude and flyback voltage is minimized, thereby minimizing the danger of damage to the image reproducing assembly. In addition, stabilization of the horizontal dimension of the reproduced image is enhanced.

Although one embodiment of the present invention has been illustrated and described, it is anticipated that various changes and modifications will be apparent to those skilled in the art and that such changes may be made without departing from the scope of the invention as defined by the following claims.

What is claimed is:

1. In a multi-line image reproducing assembly having a horizontal deflection coil, a circuit device for changing the line rate of the assembly without changing the horizontal dimensions of the reproduced image, said circuit device comprising: junction means connectable with a D.C. source of voltage; adjustment means for varying the voltage level from said source of D.C. voltage supplied to said junction means, and circuit means connected to the horizontal deflection coil of said image reproducing assembly and to said junction means, said circuit means being responsive to a selected voltage level supplied from said source through said junction means for causing scan deflection signals to be produced across said coil, said circuit means including means for maintaining the peak magnitude of said signals substantially constant regardless of changes in the selected voltage level and for changing the frequency of occurrence of said signals in response to changes in the selected voltage level whereby changes in the selected voltage level changes the horizontal line rate of said assembly without changing the horizontal dimension of said reproduced image.

2. A circuit device according to claim 1 wherein said means for maintaining the peak magnitude includes first means connected with said voltage source through said junction means and responsive to a selected voltage level for controlling the shape of said deflection signals and second means connected with said voltage source through said junction means and responsive to said selected voltage level for controlling the frequency of occurrence of said signals and for also affecting the shape of said signals whereby both said first and second means are substantially simultaneously responsive to a change in the selected voltage level for maintaining the peak magnitude of said signals constant while changing the frequency of occurrence thereof.

3. A circuit device according to claim 2 wherein said second means includes a linear voltage controlled oscillator connected with said voltage souce through said junction means and with said first means.

4. A circuit device according to claim 3 wherein said first means includes voltage establishing means connected with said voltage source through said junction means for establishing a voltage level substantially equal to the selected voltage level supplied from said source.

5. A circuit device for controlling at least one dimension of scan in an image reproducing assembly having a scan deflection coil, said circuit device comprising a junction connectable with a voltage source; adjustment means for varying the voltage level supplied through said junction from a connected voltage source and circuit means connected between said scan deflection coil and said junction, said circuit means being responsive to a selected voltage level supplied from said junction for causing scan deflection signals to be produced across said deflection coil, said circuit means including means for maintaining the peak magnitude of said signals substantially constant regardless of changes in the selected voltage level, for increasing the frequency of occurrence of said signals with an increase in the selected voltage level, and for decreasing the frequency of occurrence of said signals with a decrease in the selected voltage level whereby said increases and decreases in the selected voltage level respectively increases and decreases the scan rate in said assembly without changing at least one dimension of the image reproduced by said assembly.

6. In a multi-line rate image producing assembly having a horizontal deflection coil, a circuit device for changing the line rate of the assembly without changing the horizontal dimensions of the reproduced image, said circuit device comprising: a junction connectable with a voltage source; adjustment means for varying the voltage level supplied to said junction from a connected voltage source; and circuit means connected with the horizontal deflection coil of said image reproducing assembly and said junction, said circuit means being responsive to a selected voltage level supplied thereto for causing scan deflection signals to be produced across said deflection coil, the frequency of occurrence and magnitude of said signals being dependent upon said selected voltage level whereby changes in the selected voltage level changes the line rate of the assembly without changing the horizontal dimensions of the reproduced image.

7. In a multi-line rate image reproducing assembly, a circuit device for changing the line rate of the assembly without changing the horizontal dimensions of the reproduced image, said circuit device comprising: a junction connectable with a voltage source; adjustment means for varying the voltage level supplied to said junction from a connected voltage source; signal producing means connected with said junction for producing an oscillatory signal having a frequency which is dependent upon and directly proportional to a selected voltage level supplied from said junction; and circuit means connected with said junction and said signal producing means and responsive to the selected voltage level and to said oscillatory signal for producing a horizontal scan deflection signal having a frequency of occurrence substantially equal to the frequency of said oscillatory signal and a peak magnitude which is directly proportional to the selected voltage level and inversely proportional to the frequency of said oscillatory signal whereby changes in the selected voltage level changes the frequency of occurrence of said scan deflection signal and therefore the line rate of said assembly without changing the peak magnitude of said scan deflection signals and therefore without changing the horizontal dimensions of the reproduced image.

8. A circuit device according to claim 7 wherein the peak magnitude of said scan deflection signals is a linear function of the selected voltage level and an equal but inverse linear function of frequency of occurrence of said oscillatory signal whereby potential changes in the magnitude of said deflection signals caused by changes in the selected voltage and frequency of occurrence substantially cancel out causing the magnitude to remain substantially constant.

9. A circuit device according to claim 8 wherein said signal producing means includes a linear voltage controlled oscillator.

* * * * *